United States Patent [19]

Imada et al.

[11] Patent Number: 5,404,344

[45] Date of Patent: Apr. 4, 1995

[54] RECORDING/REPRODUCING OPTICAL HEAD PRODUCING FOCUSING ERROR SIGNAL FROM ZERO-TH ORDER DIFFRACTED LIGHT AND TRACKING ERROR SIGNAL FROM FIRST ORDER DIFFRACTED LIGHT

[75] Inventors: Nobuo Imada; Kunikazu Ohnishi, both of Chigasaki; Tohru Sasaki; Masayuki Inoue, both of Yokohama; Akira Arimoto, Kodaira; Shigeru Nakamura, Tachikawa; Takeshi Nakao, Sagamihara, all of Japan

[73] Assignee: Hitachi, Ltd., Tokyo, Japan

[21] Appl. No.: 154,482

[22] Filed: Nov. 19, 1993

Related U.S. Application Data

[63] Continuation of Ser. No. 862,364, Apr. 2, 1992, abandoned.

[30] Foreign Application Priority Data

Apr. 4, 1991 [JP] Japan ................................. 3-097881
Feb. 3, 1992 [JP] Japan ................................. 4-046361

[51] Int. Cl.6 .............................................. G11B 7/00
[52] U.S. Cl. ............................. 369/44.14; 369/44.23; 369/44.41; 369/109; 369/112; 369/110
[58] Field of Search ............. 369/44.11, 44.41, 44.42, 369/112, 109, 110, 44.14, 44.23, 44.12

[56] References Cited

U.S. PATENT DOCUMENTS

| | | | |
|---|---|---|---|
| 4,658,391 | 4/1987 | Nozu et al. | 369/44.41 |
| 4,771,414 | 9/1988 | Yoshimatsu | 369/110 |
| 4,773,053 | 9/1988 | Gottfried | 369/44.41 |
| 4,817,074 | 3/1989 | Yamanaka | 369/112 |
| 4,926,409 | 5/1990 | Tsuyuguchi et al. | 369/112 |
| 4,945,529 | 7/1990 | Ono et al. | 369/109 |
| 4,951,274 | 8/1990 | Iwanaga et al. | 369/112 |
| 4,970,710 | 11/1990 | Lee | 369/44.23 |
| 5,095,477 | 3/1992 | Shimozawa | 369/112 |

FOREIGN PATENT DOCUMENTS

| | | | |
|---|---|---|---|
| 0318912 | 6/1989 | European Pat. Off. | 369/109 |
| 63-161543 | 7/1988 | Japan | 369/109 |
| 63-187441 | 8/1988 | Japan | 369/110 |
| 63-311631 | 12/1988 | Japan | 369/109 |
| 02101641 | 4/1990 | Japan | 369/110 |
| 02230518 | 9/1990 | Japan | 369/109 |

Primary Examiner—Aristotelis Psitos
Assistant Examiner—P. W. Huber
Attorney, Agent, or Firm—Antonelli, Terry, Stout & Kraus

[57] ABSTRACT

A recording/reproducing optical head capable of causing a light spot on a photodetector for detecting a focusing error signal to stand still without being affected by variations in wavelength of light used, capable of adjusting a tracking error signal independently of the focusing error signal, and capable of utilizing light having an order of diffraction of −1 for the purpose of detecting a signal, in which a cylindrical lens for generating astigmatism and a diffraction grating made up of two regions different in the direction of diffraction or the angle of diffraction from each other are interposed between a beam splitter and a photodetector, a light beam diffracted from the diffraction grating and including the diffracted light of the zero-th order (that is, light which has passed through the diffraction grating without being deflected) is received by the photodetector, the diffracted light of the zero-th order is used for detecting a focusing error signal according to the astigmatism method, and diffracted light having an order of diffraction of +1 and diffracted light having an order of diffraction of −1 are used for detecting a tracking error signal.

12 Claims, 4 Drawing Sheets

RECORDING/REPRODUCING OPTICAL HEAD PRODUCING FOCUSING ERROR SIGNAL FROM ZERO-TH ORDER DIFFRACTED LIGHT AND TRACKING ERROR SIGNAL FROM FIRST ORDER DIFFRACTED LIGHT

This application is a continuation of application Ser. No. 862,364, filed on Apr. 2, 1992, now abandoned.

BACKGROUND OF THE INVENTION

The present invention relates to an optical head for reproducing an information signal from an optical information-recording medium, or performing both a recording operation and a reproducing operation for the optical information-recording medium, and more particularly to an optical head in which a focusing error signal according to the astigmatism method and a tracking error signal according to the push-pull method are both detected by a single optical system, and the focusing error signal and the tracking error signal can be adjusted independently of each other.

FIG. 1 shows a conventional optical head for detecting a focusing error signal according to the astigmatism method and a tracking error signal according to the push-pull method.

Referring to FIG. 1, a light beam emitted from a semiconductor laser 1 is converted by a collimator lens 2 into a light beam formed of parallel rays. The light beam from the collimator lens 2 passes through a polarization beam splitter 3 and a quarter wavelength plate 4, and is then deflected by a reflecting mirror 13. The deflected light beam is focused by an objective lens 5 on a disk 21 which serves as an information recording medium. head small in size and weight.

Further, another optical head is proposed in a Japanese patent application JP-A-63-161,543. In this optical head, a detecting optical system is not divided by the beam splitter into the optical system for detecting the focusing error and the optical system for detecting the tracking error, but includes a diffraction grating made up of a plurality of regions which are different from each other in the direction of diffraction or the angle of diffraction. Thus, a light beam which is reflected from the disk and then reflected from the polarization beam splitter is diffracted by each region of the diffraction grating, and a focusing error signal and a tracking error signal are detected from diffracted light beams having the order of diffraction equal to +1 (namely, an order of diffraction of +1). Further, an information signal is detected from the diffracted light beam of the zero-th order. Thus, the focusing error signal, the tracking error signal and the information signal can be obtained by a single detecting optical system.

In the proposed optical head, however, the following problem arises because the focusing error signal and the tracking error signal are both detected from the diffracted light beams having an order of diffraction of +1. That is, when the oscillation wavelength of the semiconductor laser serving as a light source varies, the angle of diffraction at each region of Light reflected from the disk 21 is incident on the polarization beam splitter 3 through the objective lens 5, the reflecting mirror 13 and the quarter wavelength plate 4, and is reflected from the polarization beam splitter 3. The light reflected from the polarization beam splitter 3 is incident on a beam splitter 22. The reflecting surface of the beam splitter 22 has a predetermined transmittance and reflectivity. Thus, the light incident on the beam splitter 22 is separated into transmitted light and reflected light.

The reflected light passes through a detection lens 6, and then passes through a cylindrical lens 7 whose cylindrical axis is inclined at an angle of about 45° to a predetermined direction such that the reflected light is provided with astigmatism. The reflected light having passed through cylindrical lens 7 is incident on a photodetector 24, and the output thereof is used for detecting a focusing error according to the astigmatism method. Further, the transmitted light from the beam splitter 22 is incident on a photodetector 23, and the output thereof is used for detecting a tracking error according to the push-pull method.

In the above optical head, the positions of the photodetectors 23 and 24 can be adjusted independently of each other, but an optical system for detecting the focusing error and an optical system for detecting the tracking error are different systems. Accordingly, there arises a problem that it is difficult to make the optical the diffraction grating is also varied, and thus the position of a light spot on a photodetector varies. At this time there arises a problem that a correct, focusing error signal cannot be obtained if the light spot on the photodetector moves in a direction other than a specified direction (that is, the direction of a boundary between a pair of detecting regions on the photodetector). In order to solve this problem, it is necessary to locate the diffraction grating accurately in relation to the photodetector so that the light spot on the photodetector moves only in the specified direction.

Further, in order to obtain a correct tracking error signal, it is necessary to adjust the tracking error signal previously. In the Japanese patent application referred to above, however, no attention is paid to the previous adjustment of the tracking error signal.

Furthermore, in the proposed optical head, the diffracted light beams having an order of diffraction of +1 are used for detecting the focusing error signal and the tracking error signal, and the diffracted light beam of the zero-th order is used for detecting the information signal. The diffracted light beams having an order of diffraction of −1, however, are not used for detecting any signal. Accordingly, the proposed optical head is low in utilization efficiency of light emerging from the diffraction grating.

SUMMARY OF THE INVENTION

It is an object of the present invention to provide an optical head which can solve the above problems of the prior art, can cause a light spot on a photodetector for detecting a focusing error signal to stand still independently of variations the in frequency of light used, can adjust a tracking error signal previously, and can use the diffracted light beams having an order of diffraction of −1, for the purpose of detecting a signal.

In order to attain the above object, according to the present invention there is provided an optical head in which astigmatism generating means and a diffraction grating made up of a plurality of regions are interposed between a beam splitter and a photodetector, at least one of light which is diffracted from each region of the diffraction grating and has an order of diffraction of +1 and light which is diffracted from each region of the diffraction grating and has an order of diffraction of −1 is used for detecting a tracking error signal according to the push-pull method, and diffracted light of the zero-th order (that is, light which passes through the diffraction grating without being deflected) is used for detecting a focusing error signal according to the astigmatism method.

In the optical head according to the present invention, a light beam reflected from a disk is separated from a light beam incident thereon by the beam splitter. Astigmatism necessary for detecting a focusing error is generated in the reflected light beam by the astigmatism generating means. The reflected light beam having the astigmatism is incident on the photodetector through the diffraction grating. The diffraction grating has two regions which are different from each other in the direction of a diffracting element (for example, a groove), and is disposed so that the image of a recording track on the diffraction grating is formed along the boundary between the regions of the diffraction grating. Accordingly, about half of the reflected light beam is incident on one of the regions, and the other half is incident on the other region. Diffracted light beams emerging from two regions and having an order of diffraction of +1 and/or diffracted light beams emerging from two regions and having an order of diffraction of −1 are detected to obtain the tracking error signal according to the push-pull method by comparing light quantities from two regions of the diffraction grating. Further, the focusing error signal according to the astigmatism method can be detected by using the diffracted light beam of the zero-th order, that is, a light beam which has passed through the diffraction grating without being deflected.

DESCRIPTION OF THE PREFERRED EMBODIMENTS

An optical head according to the present invention will be explained below in detail with reference to the drawings.

Figure 1:
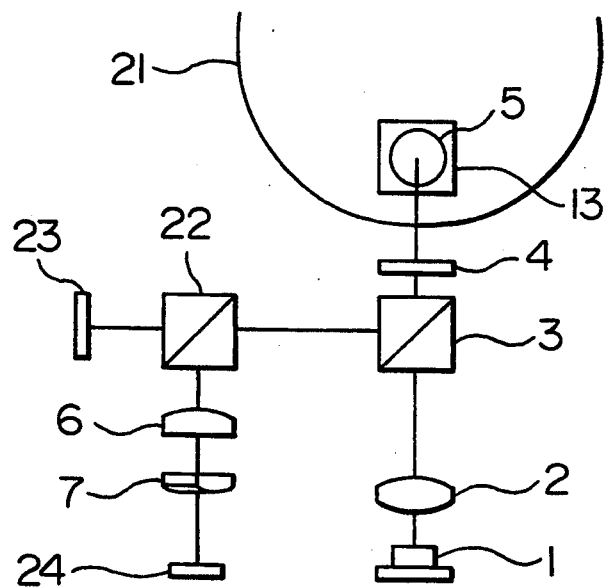
FIG. 1 is a schematic diagram showing the construction of a conventional recording/reproducing optical head.
Figure 2:
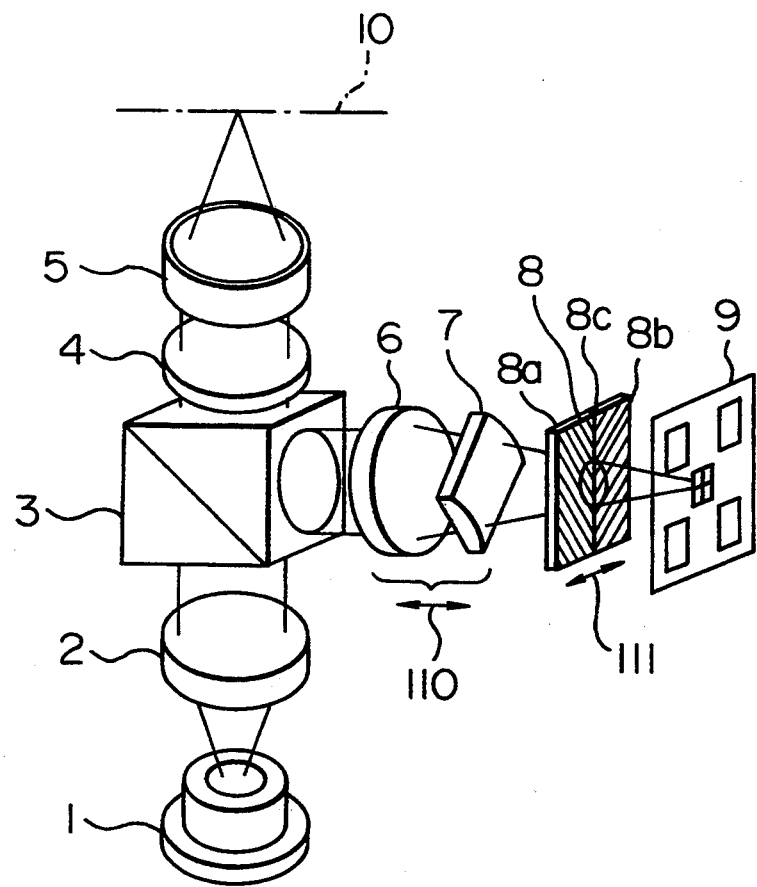
FIG. 2 is a perspective view showing the construction of an embodiment of a recording/reproducing optical head according to the present invention.

FIG. 2 is a perspective view showing the construction of an embodiment of an optical head according to the present invention.

Referring to FIG. 2, a light beam emitted from a semiconductor laser 1 and formed of a divergent bundle of rays is converted by a collimator lens 2 into a light beam formed of parallel rays. The semiconductor laser 1 serves as a light source. The light beam from the collimator lens 2 passes through a polarization beam splitter (PBS) 3 and a quarter wavelength plate 4, and is then focused on a disk (not shown) by an objective lens 5. The disk serves as an information recording medium. A light beam reflected from the disk passes through the objective lens 5 and the quarter wavelength plate 4, and is then reflected from the polarization beam splitter 3. The light beam reflected from the beam splitter 3 is converted by a detection lens 6 into a light beam formed of a convergent bundle of rays. The light beam from the detection lens 6 passes through a cylindrical lens 7 whose cylindrical axis is inclined at an angle of about 45° to a predetermined direction such that the light beam is provided with astigmatism necessary for detecting a focusing error, and is then incident on a photodetector 9 through a diffraction grating 8.

The diffraction grating 8 is made up of two regions 8a and 8b which are different from each other in the direction of a diffracting element (for example, a groove), and is disposed so that a boundary 8c between the regions 8a and 8b coincide with an image of a recording track 10 formed on the disk which appears on the diffraction grating 8. Diffracted light beams from the regions 8a and 8b and detected, and the light intensities of these light beams are compared with each other to obtain a tracking error signal according to the push-pull method. Further, the diffracted light of the zero-th order from the diffraction grating 8, that is, a light beam which passes through the diffraction grating without being deflected, is used for detecting a focusing error signal according to the astigmatism method.

The operation of the present embodiment will be explained below in more detail with reference to FIGS. 3A and 3B.

Figure 3A:
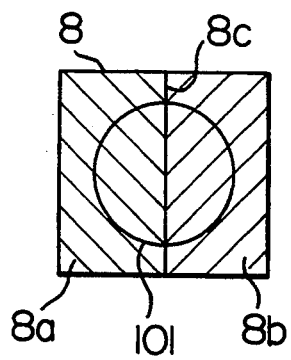
FIG. 3A is a front view showing a diffraction grating which is used in the embodiment of FIG. 2.
Figure 3B:
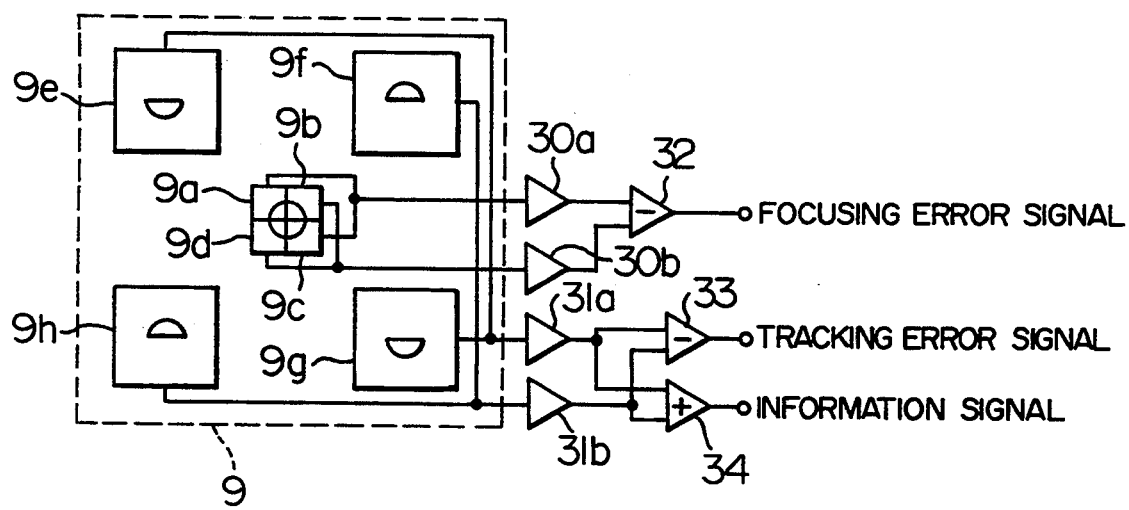
FIG. 3B shows the front of a photodetector used in the embodiment of FIG. 2 and an arithmetic circuit connected to the photodetector for obtaining various signals.

FIGS. 3A and 3B show the diffraction grating 8, the photodetector 9, and an arithmetic circuit for obtaining various signals in detail. That is, FIG. 3A is a front view showing the diffraction grating 8, and FIG. 3B shows the front of the photodetector 9 and the arithmetic circuit.

Referring to FIGS. 3A and 3B, a light beam 101 incident on the diffraction grating 8 is divided at the boundary 8c into the first and second parts which are diffracted by the regions 8a and 8b, respectively. A divided light-receiving region made up of four regions 9a to 9d is formed in a central portion of the photodetector 9, and four light receiving regions 9e to 9h which are independent of one another are formed in a peripheral portion of the photodetector 9.

The diffracted light of the zero-th order from the diffraction grating 8, that is, a light beam which has passed through the diffraction grating 8 without being deflected, is incident on the light receiving regions 9a to 9d of the photodetector 9, and a photocurrent corresponding to an incident light quantity flows out from each of the light receiving regions 9a to 9d. A combined photocurrent flowing out from the regions 9a and 9c and a combined photocurrent flowing out from the regions 9b and 9d are inverted by current-voltage converters 30a and 30b into a pair of voltages. These voltages are applied to a differential amplifier 32 to obtain a focusing error signal according to the astigmatism method.

Also, a light beam diffracted from the region 8a and having an order of diffraction of +1 and a light beam diffracted from the region 8a and having an order of diffraction of −1 are incident on the light receiving regions 9f and 9h of the photodetector 9, respectively. Further, a light beam diffracted from the region 8b and having an order of diffraction of +1 and a light beam diffracted from the region 8b and having an order of diffraction of −1 are incident on the light receiving regions 9e and 9g of the photodetector 9, respectively. A photocurrent corresponding to an incident light intensity flows out from each of the light receiving regions 9e to 9h. A combined photocurrent flowing out from the light receiving regions 9e and 9g and a combined photocurrent flowing out from the light receiving regions 9f and 9h are converted by current-voltage converters 31a and 31b into a pair of voltages. These voltages are applied to a differential amplifier 33 to obtain a tracking error signal according to the push-pull method.

As shown in FIGS. 3A and 3B, the semicircular image of a light spot on the disk which is formed on each of the light receiving regions 9e to 9f is inclined at an angle of ±90° to the image of the light spot which is formed on each of the regions 8a and 8b of the diffraction grating 8. This is because astigmatism is generated in a light beam incident on the diffraction grating 8 by the cylindrical lens 7. However, not the shape of an image of the light spot formed on each of the light receiving regions 9e to 9h, but a light intensity incident on each of the light receiving regions 9e to 9h, is used for detecting the tracking error signal. Accordingly, the above change in shape of the image will not a cause problem.

Further, an information signal is obtained by summing up light intensities incident on the light receiving regions 9e to 9h, that is, by applying the outputs of the current-voltage converters 31a and 31b to an adder 34. Alternatively, the information signal may be obtained by summing up light quantities incident on the light receiving regions 9a to 9d, or by summing up light quantities incident on all of the light receiving regions 9a to 9h.

The focusing error signal is previously adjusted so as to have a predetermined value at a time when an incident light beam is just focused on the disk. Such adjustment of the focusing error signal is made by moving the detection lens 6 and the cylindrical lens 7, as a unit, in the direction 110 of an optical axis. Alternatively, the photodetector 9 may be moved in the direction 110 of the optical axis. Further, the tracking error signal is previously adjusted so as to have a predetermined value at a time when a light spot is accurately located on a recording track. Such adjustment of the tracking error signal is made by moving the diffraction grating 8 in a direction 111 perpendicular to the boundary 8c. That is, the adjustment of the tracking error signal can be made independently of the adjustment of the focusing error signal.

As can be seen from the above, according to the present embodiment, the focusing error signal according to the astigmatism method and the tracking error signal according to the push-pull method are both detected by a single simple optical system. Further, in the present embodiment, the diffracted light of the zero-th order from the diffraction grating 8 is used for detecting the focusing error signal. Accordingly, even when the oscillation wavelength of the semiconductor laser 1 serving as a light source varies, a light spot on the light receiving regions 9a to 9d does not move, and thus a correct focusing error signal is obtained.

Further, the diffracted light having an order of diffraction of ±1 and the diffracted light having an order of diffraction of −1 are used for detecting the tracking error signal. Accordingly, the light spots on the light receiving regions 9e to 9h move in accordance with a change in the oscillation wavelength of the semiconductor laser 1. However, light intensities incident on the light receiving regions 9e to 9h are used for detecting the tracking error signal. Accordingly, when the size of each of the light receiving regions 9e to 9h is designed while taking the above movement of the light spot into consideration, a change in the oscillation wavelength of the semiconductor laser 1 will raise no problem. In addition to the diffracted light having an order of diffraction of +1, the diffracted light having an order of diffraction of −1 is used for detecting the tracking error signal. Accordingly, the present embodiment is excellent in utilization efficiency of light emerging from the diffraction grating.

In the present embodiment, the diffraction grating 8 is interposed between the cylindrical lens 7 and the photodetector 9. Alternatively, the diffraction grating 8 may be disposed between the polarization beam splitter 3 and the detection lens 6. Further, a beam shaping prism may be disposed between the collimator lens 2 and the polarization beam splitter 3 to correct the anisotropy of intensity distribution in the light beam emitted from the semiconductor laser 1, or a reflecting mirror may be disposed in the optical system of FIG. 2 for the purpose of deflecting an optical path. Such changes in the optical system of FIG. 2 can be made without departing from the spirit of the present invention.

Next, a first modified version of the present embodiment will be explained, with reference to FIG. 4.

Figure 4:
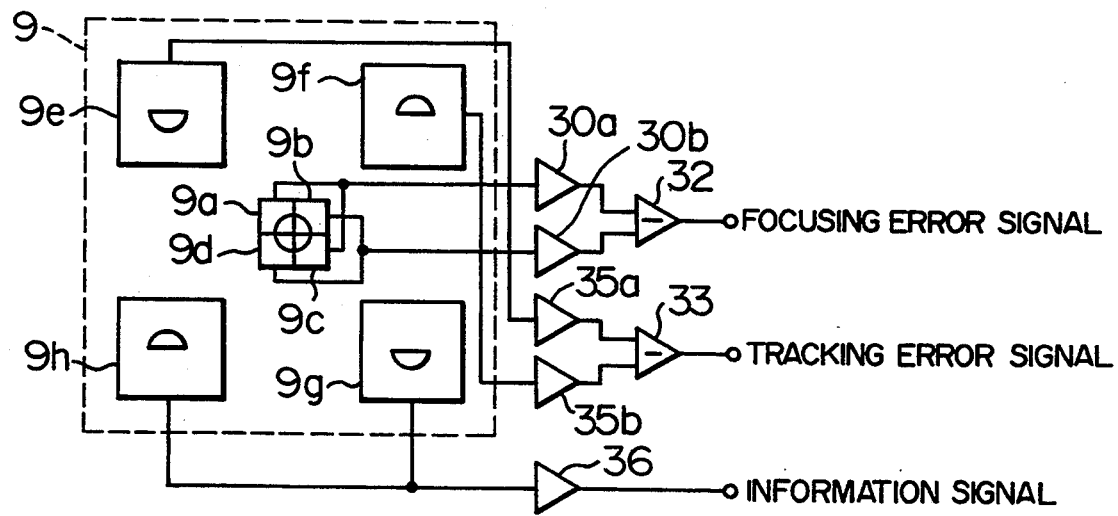
FIG. 4 shows the front of a photodetector used in a modified version of the embodiment of FIG. 2 and an arithmetic circuit connected to the photodetector for obtaining various signals.

FIG. 4 shows the front of the photodetector 9 used in the first modified version and an arithmetic circuit connected to the photodetector 9 for obtaining various signals.

As is apparent from FIGS. 3B and 4, the first modified version is different from the above embodiment only in the circuit configuration of an arithmetic circuit for obtaining the tracking error signal and the information signal.

Accordingly, in the first modified version, the diffracted light of the zero-th order, that is, a light beam which has passed through the diffraction grating 8 without being deflected, is incident on the light receiving regions 9a to 9d of the photodetector 9. Thus, a photocurrent corresponding to an incident light intensity flows out from each of the light receiving regions 9a to 9d. A combined photocurrent flowing out from the light receiving regions 9a and 9c and a combined photocurrent flowing out from the light receiving regions 9b and 9d are converted by the current-voltage converters 30a and 30b into of a pair of voltages. These voltages are applied to the differential amplifier 32 to obtain the focusing error signal according to the astigmatism method.

Also, a light beam diffracted from the region 8a and having an order of diffraction of +1 is incident on the light receiving region 9e of the photodetector 9, and a light beam diffracted from the region 8b and having an order of diffraction of +1 is incident on the light receiving region 9e of the photodetector 9. A photocurrent corresponding to an incident light intensity flows out from each of the light receiving regions 9e and 9f. A photocurrent flowing out from the light receiving region 9e and a photocurrent flowing out from the light receiving region 9f are converted by current-voltage converters 35a and 35b into a pair of voltages. These voltages are applied to the differential amplifier 33 to obtain the tracking error signal according to the push-pull method.

Further, a light beam diffracted from the region 8a and having an order of diffraction of −1 is incident on the light receiving region 9h of the photodetector 9, and a light beam diffracted from the region 8b and having an order of diffraction of −1 is incident on the light receiving region 9g. A photocurrent corresponding to an incident light intensity flows out from each of the light receiving regions 9g and 9h. A combined photocurrent flowing out from of the light receiving regions 9g and 9h is converted by a current-voltage converter 36 into a voltage which is used as the information signal.

According to the first modified version, the diffracted light beams having an order of diffraction of +1 are used for detecting the tracking error signal, and the diffracted light beams having an order of diffraction of −1 are used for detecting the information signal. Accordingly, like the above-mentioned embodiment using the arithmetic circuit of FIG. 3B, the first modified version is excellent in utilization efficiency of light emerging from the diffraction grating.

In general, the frequency band of each of the focusing error signal and the tracking error signal lies in a range from several kilohertz to tens of kilohertz. On the other hand, the information signal has a frequency band of several megahertz. In the embodiment of FIG. 2, the current-voltage converters 31a and 31b are used for detecting both of the tracking error signal and the information signal, and thus are required to have a wide frequency band. In the first modified version, as shown in FIG. 4, the current-voltage converters 35a and 35b are used for detecting the tracking error signal, and the current-voltage converter 36 is used for detecting the information signal. Accordingly, it is possible to use current-voltage converters, which correspond to the wavelength band of a signal to be detected. That is, a single current-voltage converter which has a wide wavelength band and is expensive, is used for detecting the information signal. Thus, the first modified version of FIG. 4 is lower in manufacturing cost than the above-mentioned embodiment of FIG. 3B.

Next, a second modified version of the embodiment will be explained with reference to FIGS. 5A and 5B.

Figure 5A:
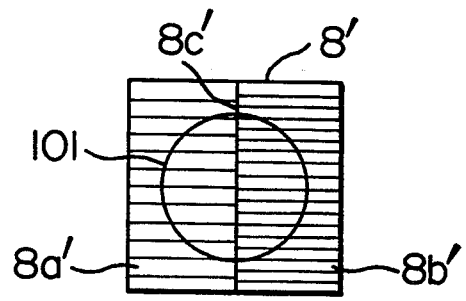
FIG. 5A is a front view showing a diffraction grating which is used in another modified version of the embodiment of FIG. 2.
Figure 5B:
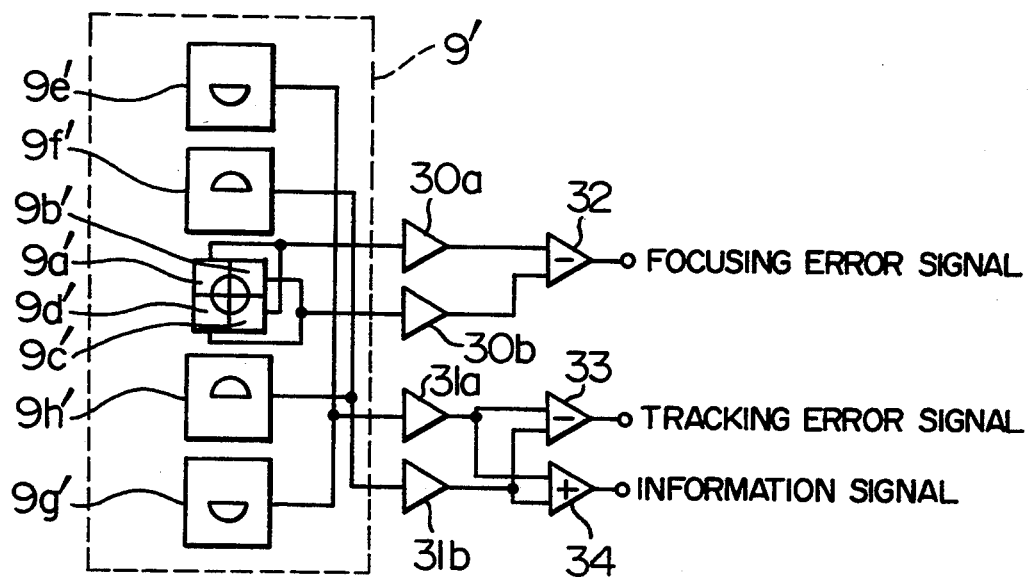
FIG. 5B shows the front of a photodetector used in another modified version of the embodiment of FIG. 2 and an arithmetic circuit connected to the photodetector for obtaining various signals.

FIGS. 5A and 5B show a diffraction grating 8', a photodetector 9' and an arithmetic circuit which are used in the second modified version in detail. That is, FIG. 5A is a front view showing the diffraction grating 8', and FIG. 5B shows the front of the photodetector 9' and the arithmetic circuit for obtaining various signals.

Referring to FIG. 5A, in a diffraction grating 8' used in the second modified version, a region 8a' is not different in the direction of a diffracting element (for example, a groove) from a region 8b', but is different in the pitch of diffracting elements from the region 8b'.

As shown in FIG. 5A, a light beam 101 incident on the diffraction grating 8' is divided by a boundary 8c' into first and second parts which are diffracted by the regions 8a' and 8b', respectively. Further, as shown in FIG. 5B, the photodetector 9' has a divided light-receiving region made up of four regions 9a' to 9d' and four independent light-receiving regions 9e' to 9h'.

Diffracted light of the zero-th order, that is, a light beam which has passed through the diffraction grating 8' without being deflected, is incident on the light receiving regions 9a' to 9d' of the photodetector 9'. A photocurrent corresponding to an incident light intensity flows out from each of the light receiving regions 9a' to 9d'. A combined photocurrent flowing out from the light receiving regions 9a' and 9c' and a combined photocurrent flowing out from the light receiving regions 9b' and 9d' are converted by the current-voltage converters 30a and 30b into a pair of voltages, respectively. These voltages are applied to the differential amplifier 32 to obtain the focusing error signal according to the astigmatism method.

Also, a light beam diffracted from the region 8a' and having an order of diffraction of +1 and a light beam diffracted from the region 8a' and having an order of diffraction of −1 are incident on the light receiving regions 9f' and 9h' of the photodetector 9', respectively. Further, a light beam diffracted from the region 8b' and having an order of diffraction of +1 and a light beam diffracted from the region 8b' and having an order of diffraction of −1 are incident on the light receiving regions 9e' and 9g' of the photodetector 9', respectively. A photocurrent corresponding to an incident light intensity flows out from each of the light receiving regions 9e' to 9g'. A combined photocurrent current flowing out from the light receiving regions 9e' and 9g' and a combined photocurrent flowing out from the light receiving regions 9f' and 9h' are converted by the current-voltage converters 31a and 31b into a pair of voltages, respectively. These voltages are applied to the differential amplifier 33 to obtain the tracking error signal according to the push-pull method.

Further, the information signal is obtained by summing up photocurrents from the light receiving regions 9e' to 9h', that is, by adding the output voltages of the current-voltage converters 31a and 31b with the aid of the adder 34. Alternatively, the information signal may be formed by summing up photocurrents from the light receiving regions 9a' to 9d', or by summing up photocurrents from the light receiving regions 9a' to 9h'.

As can be seen from the above, according to the second modified version, the focusing error signal according to the astigmatism method, the tracking error signal according to the push-pull method and the information signal are all detected by a single simple optical system. It is to be noted that the regions 8a' and 8b' of the diffraction grating 8' may be made different from each other in both of the direction of a diffracting element and the pitch of diffracting elements.

Further, like the first modified version of FIG. 4, the diffracted light beams having an order of diffraction of +1 may be used for detecting the tracking error signal and the diffracted light beams having an order of diffraction of −1 may be used for detecting the information signal. In this case, current-voltage converters used for the detection of the tracking error signal can be made different in a frequency band from a current-voltage converter used for the detection of the information signal.

Next, a third modified version of the present invention will be explained with reference to FIG. 6.

Figure 6:
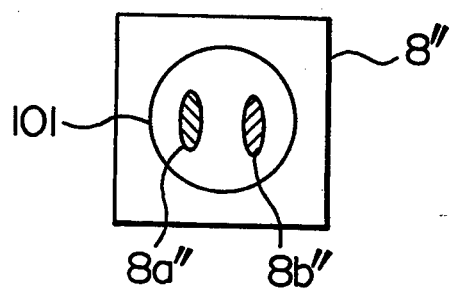
FIG. 6 is a front view showing a diffraction grating which is used in a further modified version of the embodiment of FIG. 2.

FIG. 6 is a front view showing the construction of a diffraction grating which is used in the third modified version in detail.

In the third modified version, as shown in FIG. 6, the whole region of a diffraction grating 8" is not always provided with a diffracting element, but a limited region of the diffraction grating 8" is provided with the diffracting element.

Referring to FIG. 6, two diffracting regions 8a" and 8b" are locally formed in the diffraction grating 8". Like the embodiment of FIGS. 3A and 3B and the first and second modified versions of FIGS. 4, 5A and 5B, the diffracting regions 8a" and 8b" are made different from each other in the direction of a diffracting element or the pitch of diffracting elements.

There is a problem that in the case where the tracking error signal is detected by the push-pull method, when the objective lens moves so as to follow the recording track on the disk, the light spot on the photodetector moves in accordance with the movement of the objective lens, and therefore an offset is produced in a detected tracking error signal. In the third modified version, the diffracting regions 8a" and 8b" are locally formed in the diffraction grating 8" so that only a part of a light beam reflected from a disk (not shown) is incident on those light receiving regions of the photodetector which are used for detecting the tracking error signal. Thus, the offset of the tracking error signal due to the movement of the objective lens can be reduced.

In the third modified version using the diffraction grating of FIG. 6, one of the arithmetic circuits of FIGS. 3B, 4 and 5B can be used.

Next, another embodiment of an optical head according to the present invention will be explained below with reference to FIG. 7.

Figure 7:
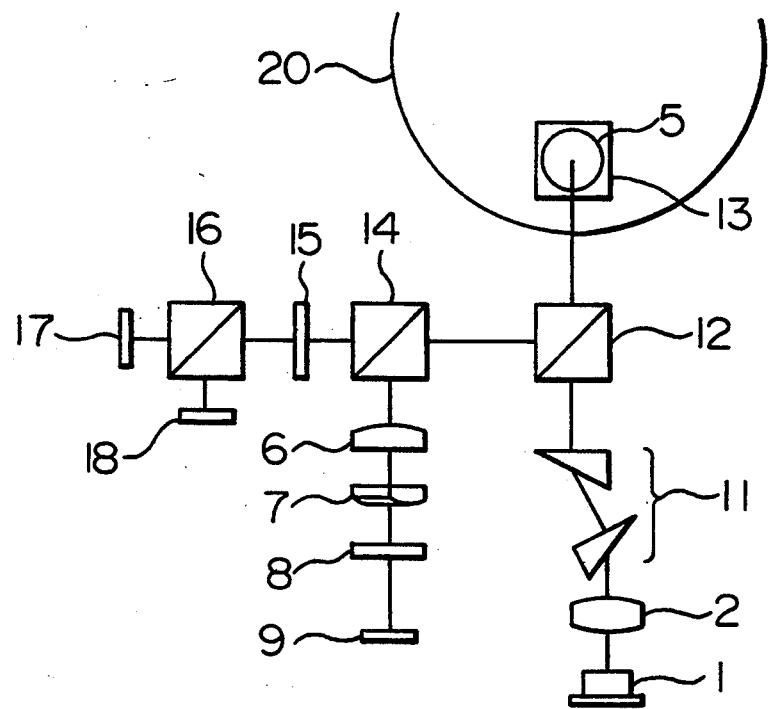
FIG. 7 is a schematic diagram showing the construction of another embodiment of a recording/reproducing optical head according to the present invention.

FIG. 7 is a schematic diagram showing the construction of the present embodiment which is used for a magneto-optic disk.

Referring to FIG. 7, a laser beam formed of a divergent bundle of rays and emitted from a semiconductor laser 1 (that is, a light source) is converted by a collimator lens 2 into a light beam formed of parallel rays. The light beam from the lens 2 passes through a beam shaping prism 11 to correct the anisotropy of intensity distribution in the light beam emitted from the semiconductor laser 1. The light beam emerging from the beam shaping prism 11 is incident on an objective lens 5 through a polarizer 12 and a reflecting mirror 13, and is then focused on a magneto-optic disk 20 by the objective lens 5. The magneto-optic disk 20 serves as a recording medium.

A light beam reflected from the magneto-optic disk 20 is incident on the polarizer 20 through the objective lens 5 and the reflecting mirror 13, and is then separated by the polarizer 12 from an optical path extending from the semiconductor laser 1 to the magneto-optic disk 20, so as to be directed to a beam splitter 14. The reflecting surface of the beam splitter 14 has a predetermined transmittance and reflectivity. Thus, the light beam incident on the beam splitter 14 is separated into a transmitted light beam and a reflected light beam.

The reflected light beam from the beam splitter 14 is incident on a cylindrical lens 7 through a detection lens 6, such that the reflected light beam is provided with astigmatism. The light beam having passed through the cylindrical lens 7 is incident on a photodetector 9 through a diffraction grating 8. The diffraction grating 8 and the photodetector 9 are the same as those shown in FIGS. 2, 3A and 3B, FIGS. 5A and 5B, or FIG. 6. Accordingly, the focusing error signal and the tracking error signal can be obtained by the methods having been already mentioned.

Further, the transmitted light beam from the beam splitter 14 passes through a half wavelength plate 15 to rotate the plane of polarization of the beam through an angle of 45°. The light beam having passed through the half wavelength plate 15 is separated by a polarization beam splitter 16 into two beams, the plane of polarization of one of which is perpendicular to the plane of polarization of the other beam. These beams are incident on photodetectors 17 and 18. A difference between a detection signal from the photodetector 17 and a detection signal from the photodetector 18 is used for reproducing a signal which has been recorded on the magneto-optic disk 20.

According to the present embodiment, the focusing error signal and the tracking error signal are both detected by a single simple optical system. Accordingly, the present embodiment is small in size and weight.

Next, a further embodiment of an optical head according to the present invention will be explained with reference to FIG. 8.

Figure 8:
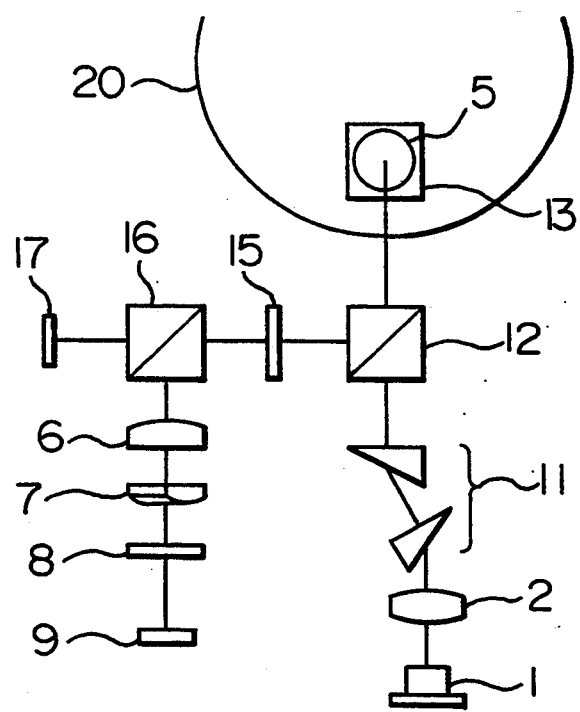
FIG. 8 is a schematic diagram showing the construction of a further embodiment of a recording/reproducing optical head according to the present invention.

FIG. 8 is a schematic diagram showing the construction of the present embodiment.

Referring to FIG. 8, a light beam emitted from the semiconductor laser 1 is converted by the collimator lens 2 into a light beam formed of parallel rays. The laser beam from the collimator lens 2 is incident on the objective lens 5 through the beam shaping prism 11, the polarizer 12 and the reflecting mirror 13, and is then focused by the objective lens 5 on the magneto-optic disk 20 which serves as a recording medium.

A light beam reflected from the magneto-optic disk 20 is reflected from the polarizer 12 through the objective lens 5 and the reflecting mirror 13. The light beam reflected from the polarizer 12 passes through the half wavelength plate 15, and is then separated by the polarization beam splitter 16 into a pair of polarized light beams, the plane of polarization of one of which is perpendicular to the plane of polarization of the other polarized light beam. In other words, the light beam incident on the polarization beam splitter 16 is separated into transmitted and reflected light beams.

The transmitted light beam from the polarization beam splitter 16 is incident on the photodetector 17. The reflected light beam from the polarization beam splitter 16 is incident on the cylindrical lens 7 through the detection lens 6 such that the reflected light beam is provided with astigmatism. The light beam having passed through the cylindrical lens 7 is incident on the photodetector 9 through the diffraction grating 8. The diffraction grating 8 and the photodetector 9 are the same as those shown in FIGS. 2, 3A and 3B, FIGS. 5A and 5B, or FIG. 6. Accordingly, the focusing error signal and the tracking error signal can be obtained by the methods having been already mentioned. Further, a photomagnetic signal is detected from a difference between the sum of detection signals from the above-mentioned light receiving regions of the photodetector 9 and a detection signal from the photodetector 17.

According to the present embodiment, the focusing error signal and the tracking error signal are both detected by a single simple optical system. Further, this optical system is used as one of two optical systems necessary for detecting the photomagnetic signal by the differential method. Thus, the present embodiment is small in size and weight.

As has been explained in the foregoing, according to the present invention, there is provided an optical head for reproducing an information signal from an optical information-recording medium or performing both a recording operation and a reproducing operation for the optical information-recording medium in which a light spot on a photodetector for detecting a focusing error signal does not move even when the oscillation wavelength of a semiconductor laser varies, the focusing error signal and a tracking error signal can be adjusted independently of each other, and a light beam diffracted from a diffraction grating and having an order of diffraction of −1 is used for detecting the tracking error signal or an information signal.

We claim:

1. A recording/reproducing optical head comprising:
   a semiconductor laser for emitting a laser beam;
   an objective lens for focusing the laser beam from the semiconductor laser into a light spot on a recording surface of an optical information recording medium, the recording surface having a recording track thereon, and for collimating light reflected from the light spot on the recording medium into a reflected light-beam propagating along a same optical path as the laser beam;
   a beam splitter for separating the reflected light beam from the laser beam;
   a diffraction grating for receiving the reflected light beam separated by the beam splitter and for diffracting the reflected beam to produce diffracted light, the diffracted light including at least diffracted light having an order of diffraction of zero, diffracted light having an order of diffraction of +1, and diffracted light having an order of diffraction of −1; and
   photodetecting means for receiving the diffracted light from the diffraction grating, for generating a focusing error signal indicative of a size of the light spot on the recording surface based on the diffracted light having an order of diffraction of zero, and for generating a tracking error signal indicative of a deviation of the light spot on the recording surface from the recording track on the recording surface using a push-pull method based on at least one of the diffracted light having an order of diffraction of +1 and the diffracted light having an order of diffraction of −1; and
   means for moving the diffraction grating in a straight line in a direction parallel to a surface of the diffraction grating receiving the reflected light beam to adjust the tracking error signal without affecting an adjustment of the focusing error signal.

2. A recording/reproducing optical head according to claim 1, wherein the photodetecting means generates the tracking error signal based on only one of the diffracted light having an order of diffraction of +1 and the diffracted light having an order of diffraction of −1, and generates an information signal indicative of an intensity of the light reflected from the light spot based on another one of the diffracted light having an order of diffraction of +1 and the diffracted light having an order of diffraction of −1.

3. A recording/reproducing optical head according to claim 1, wherein the photodetecting means includes a monolithic photodetector having a plurality of photodetecting areas.

4. A recording/reproducing optical head comprising:
   a semiconductor laser for emitting a laser beam;
   an objective lens for focusing the laser beam from the semiconductor laser into a light spot on a recording surface of an optical information recording medium, the recording surface having a recording track thereon, and for collimating light reflected from the light spot on the recording medium into a reflected light beam propagating along a same optical path as the laser beam;
   a beam splitter for separating the reflected light beam from the laser beam;
   a diffraction grating for receiving the reflected light beam separated by the beam splitter and for diffracting the reflected beam to produce diffracted light, the diffracted light including at least diffracted light having an order of diffraction of zero, diffracted light having an order of diffraction of +1, and diffracted light having an order of diffraction of −1, the diffraction grating being divided into a plurality of diffracting regions differing from each other in at least one of an angle of diffraction and a direction of diffraction;
   photodetecting means for receiving the diffracted light from the diffraction grating, for generating a focusing error signal indicative of a size of the light spot on the recording surface using an astigmatism method based on the diffracted light having an order of diffraction of zero, and for generating a tracking error signal indicative of a deviation of the light spot on the recording surface from the recording track on the recording surface using a push-pull method based on at least one of the diffracted light having an order of diffraction of +1 and the diffracted light having an order of diffraction of −1;
   astigmatism generating means for generating astigmatism in one of the reflected light beam received by the diffraction grating and the diffracted light received by the photodetecting means, the astigmatism generating means having a meridional focal line oriented at an angle of approximately 45° to the recording track when the meridional focal line is projected onto the recording surface; and
   means for moving the diffraction grating in a straight line in a direction parallel to a surface of the diffraction grating receiving the reflected light beam to adjust the tracking error signal without affecting an adjustment of the focusing error signal.

5. A recording/reproducing optical head according to claim 4, wherein the diffraction grating is divided into a first diffracting region having diffraction grooves oriented at an angle of approximately +45° to the recording track when the recording track is projected onto the diffraction grating and a second diffracting region having diffraction grooves oriented at an angle of approximately −45° to the recording track when the recording track is projected onto the diffraction grating, and wherein a boundary between the first diffracting region and the second diffracting region coincides with the recording track when the recording track is projected onto the diffraction grating.

6. A recording/reproducing optical head according to claim 5, wherein the photodetecting means generates the tracking error signal based on only one of the diffracted light having an order of diffraction of +1 and the diffracted light having an order of diffraction of −1, and generates an information signal indicative of an intensity of the light reflected from the light spot based on another one of the diffracted light having an order of diffraction of +1 and the diffracted light having an order of diffraction of −1.

7. A recording-reproducing optical head according to claim 4, wherein the photodetecting means generates the tracking error signal based on only one of the diffracted light having an order of diffraction of +1 and the diffracted light having an order of diffraction of −1, and generates an information signal indicative of an intensity of the light reflected from the light spot based on another one of the diffracted light having an order of diffraction of +1 and the diffracted light having an order of diffraction of −1.

8. A recording/reproducing optical head according to claim 4, wherein the photodetecting means includes a monolithic photodetector having a plurality of photodetecting areas.

9. A recording/reproducing optical head comprising a semiconductor laser for emitting a laser beam;
an objective lens for focusing the laser beam from the semiconductor laser into a light spot on a recording surface of an optical information recording medium, the recording surface having a recording track thereon, and for collimating light reflected from the light spot on the recording medium into a reflected light beam propagating along a same optical path as the laser beam;
a first beam splitter for separating the reflected light beam from the laser beam;
a second beam splitter for receiving the reflected light beam separated by the first beam splitter and producing a transmitted light beam and a reflected light beam from the reflected light beam separated from the first beam splitter;
polarization separating means for separating one of the transmitted light beam and the reflected light beam from the second beam splitter into two polarized light beams having mutually perpendicular planes of polarization;
first photodetecting means for receiving the two polarized light beams from the polarization separating means;
a diffraction grating for receiving another one of the transmitted light beam and the reflected light beam from the second beam splitter not received by the polarization separating means and for diffracting the other one of the transmitted light beam and the reflected light beam to produce diffracted light, the diffracted light including at least diffracted light having an order of diffraction of zero, diffracted light having an order of diffraction of +1, and diffracted light having an order of diffraction of −1, the diffraction grating being divided into a first diffracting region having diffraction grooves oriented at an angle of approximately +45° to the recording track when the recording track is projected onto the diffraction grating and a second diffracting region having diffraction grooves oriented at an angle of approximately −45° to the recording track when the recording track is projected onto the diffraction grating, a boundary between the first diffracting region and the second diffracting region coinciding with the recording track when the recording track is projected onto the diffraction grating;
second photodetecting means for receiving the diffracted light from the diffraction grating, for generating a focusing error signal indicative of a size of the light spot on the recording surface using an astigmatism method based on the diffracted light having an order of diffraction of zero, and for generating a tracking error signal indicative of a deviation of the light spot on the recording surface from the recording track on the recording surface using a push-pull method based on at least one of the diffracted light having an order of diffraction of +1 and the diffracted light having an order of diffraction of −1;
astigmatism generating means for generating astigmatism in one of the other one of the transmitted light beam and the reflected light beam received by the diffraction grating and the diffracted light received by the second photodetecting means, the astigmatism generating means having a meridional focal line oriented at an angle of approximately 45° to the recording track when the meridional focal line is projected onto the recording surface; and
means for moving the diffraction grating in a straight line in a direction parallel to a surface of the diffraction grating receiving the other one of the transmitted light beam and the reflected light beam to adjust the tracking error signal without affecting an adjustment of the focusing error signal.

10. A recording/reproducing optical head according to claim 9, wherein the second photodetecting means includes a monolithic photodetector having a plurality of photodetecting areas.

11. A recording/reproducing optical head comprising
a semiconductor laser for emitting a laser beam;
an objective lens for focusing the laser beam from the semiconductor laser into a light spot on a recording surface of an optical information recording medium, the recording surface having a recording track thereon, and for collimating light reflected from the light spot on the recording medium into a reflected light beam propagating along a same optical path as the laser beam;
a beam splitter for separating the reflected light beam from the laser beam;
polarization separating means for separating the reflected light beam separated by the beam splitter into two polarized light beams having mutually perpendicular planes of polarization;
first photodetecting means for receiving one of the two polarized light beams from the polarization separating means;
a diffraction grating for receiving another one of two polarized light beams from the polarization separating means not received by the first photodetecting means and for diffracting the other one of the two polarized light beams to produce diffracted light, the diffracted light including at least diffracted light having an order of diffraction of zero, diffracted light having an order of diffraction of +1, and diffracted light having an order of diffraction of −1, the diffraction grating being divided into a first diffracting region having diffraction grooves oriented at an angle of approximately +45° to the recording track when the recording track is projected onto the diffraction grating and a second diffracting region having diffraction grooves oriented at an angle of approximately −45° to the recording track when the recording track is projected onto the diffraction grating, a boundary between the first diffracting region and the second diffracting region coinciding with the recording track when the recording track is projected onto the diffraction grating;

second photodetecting means for receiving the diffracted light from the diffraction grating, for generating a focusing error signal indicative of a size of the light spot on the recording surface using an astigmatism method based on the diffracted light having an order of diffraction of zero, and for generating a tracking error signal indicative of a deviation of the light spot on the recording surface from the recording track on the recording surface using a push-pull method based on at least one of the diffracted light having an order of diffraction of +1 and the diffracted light having an order of diffraction of −1;

astigmatism generating means for generating astigmatism in one of the other one of the two polarized light beams received by the diffraction grating and the diffracted light received by the second photodetecting means, the astigmatism generating means having a meridional focal line oriented at an angle of approximately 45° to the recording track when the meridional focal line is projected onto the recording surface; and means for moving the diffraction grating in a straight line in a direction parallel to a surface of the diffraction grating receiving the other one of the two polarized light beams to adjust the tracking error signal without affecting an adjustment of the focusing error signal.

12. A recording/reproducing optical head according to claim 11, wherein the second photodetecting means includes a monolithic photodetector having a plurality of photodetecting areas.

* * * * *